(12) United States Patent
Burke et al.

(10) Patent No.: US 8,443,704 B2
(45) Date of Patent: May 21, 2013

(54) FLY-CUTTING SYSTEM AND METHOD, AND RELATED TOOLING AND ARTICLES

(75) Inventors: James P. Burke, St. Paul, MN (US); Alan B. Campbell, Santa Rosa, CA (US); Dale L. Ehnes, Cotati, CA (US); Daniel S. Wertz, Sebastopol, CA (US)

(73) Assignee: 3M Innovative Properties Company, Saint Paul, MN (US)

( * ) Notice: Subject to any disclaimer, the term of this patent is extended or adjusted under 35 U.S.C. 154(b) by 81 days.

(21) Appl. No.: 12/777,611

(22) Filed: May 11, 2010

(65) Prior Publication Data
US 2010/0218650 A1   Sep. 2, 2010

Related U.S. Application Data

(62) Division of application No. 11/834,371, filed on Aug. 6, 2007, now abandoned.

(51) Int. Cl.
*B23B 29/24* (2006.01)

(52) U.S. Cl.
USPC .................... 82/1.11; 82/159; 82/131

(58) Field of Classification Search
USPC ............. 409/25, 26, 27, 28, 38, 50, 51, 56, 409/57, 75, 76, 165; 82/131, 159, 1.11
See application file for complete search history.

(56) References Cited

U.S. PATENT DOCUMENTS

| | | | |
|---|---|---|---|
| 869,319 A * | 10/1907 | Marvin | ........................ 409/56 |
| 1,329,805 A | 2/1920 | Schurr | |
| 1,445,898 A | 2/1923 | Lutz | |
| 1,465,240 A | 8/1923 | Schurr | |
| 2,286,709 A | 6/1942 | Barcus | |
| 2,310,790 A | 2/1943 | Jungersen | |
| 2,379,093 A | 6/1945 | Massonneau | |
| 3,099,939 A | 8/1963 | Haase et al. | |
| 3,343,458 A | 9/1967 | Larsson | |
| 3,466,212 A | 9/1969 | Clayton et al. | |
| 3,587,385 A | 6/1971 | Orend | |
| 3,644,049 A | 2/1972 | Hahn et al. | |
| 3,742,815 A | 7/1973 | Sukhov et al. | |

(Continued)

FOREIGN PATENT DOCUMENTS

| | | |
|---|---|---|
| CH | 671 187 | 8/1989 |
| DE | 31 32 637 A1 | 3/1983 |

(Continued)

OTHER PUBLICATIONS

Davies, et al., "Application of precision diamond machining to the manufacture of micro-photonics components", Proc. of SPIE vol. 5183, 2003, pp. 94-108.

(Continued)

*Primary Examiner* — Kenneth E. Peterson
*Assistant Examiner* — Jennifer Swinney

(57) ABSTRACT

Methods of fly-cutting a workpiece are disclosed, and in methods in which the position of a fly-cutting head or its associated cutting element is known as a function of time. Also disclosed are methods of forming features, such as grooves or groove segments, in a workpiece such as a cylindrical roll. The features may be provided according to one or more disclosed patterns. Articles made using tools machined in the manner described are also provided, such as polymeric film or sheeting that exhibit certain beneficial properties.

20 Claims, 9 Drawing Sheets

U.S. PATENT DOCUMENTS

| | | | |
|---|---|---|---|
| 4,034,646 A | | 7/1977 | Dahlin |
| 4,141,278 A | | 2/1979 | Lieser |
| 4,164,891 A | | 8/1979 | Lieser |
| 4,338,073 A | * | 7/1982 | Wielesiuk .................... 425/115 |
| 4,784,538 A | | 11/1988 | Tlaker et al. |
| 4,883,392 A | | 11/1989 | Lieser |
| 4,949,456 A | | 8/1990 | Kovach et al. |
| 4,981,402 A | * | 1/1991 | Krenzer et al. ................ 409/26 |
| 5,050,468 A | * | 9/1991 | Nydigger ...................... 82/1.11 |
| 5,139,005 A | | 8/1992 | Dodd |
| 5,175,030 A | | 12/1992 | Lu et al. |
| 5,216,843 A | | 6/1993 | Breivogel et al. |
| 5,257,882 A | | 11/1993 | Stadtfeld et al. |
| 5,351,589 A | | 10/1994 | Creaden |
| 5,360,270 A | | 11/1994 | Appeldorn et al. |
| 5,431,514 A | * | 7/1995 | Saito et al. ................... 409/132 |
| 5,540,128 A | | 7/1996 | Creaden |
| 5,558,110 A | * | 9/1996 | Williford, Jr. ............... 134/56 R |
| 5,598,618 A | * | 2/1997 | Aquino et al. ................. 29/889 |
| 5,695,305 A | | 12/1997 | Heym |
| 5,713,253 A | | 2/1998 | Date et al. |
| 5,720,210 A | | 2/1998 | Okahashi |
| 5,800,103 A | | 9/1998 | Stadtfeld et al. |
| 5,874,155 A | | 2/1999 | Gehrke et al. |
| 5,899,645 A | | 5/1999 | Garschagen et al. |
| 5,919,551 A | | 7/1999 | Cobb, Jr. et al. |
| 6,053,676 A | | 4/2000 | Garschagen et al. |
| 6,077,462 A | | 6/2000 | Lundin et al. |
| 6,129,801 A | | 10/2000 | Benson et al. |
| 6,280,063 B1 | | 8/2001 | Fong et al. |
| 6,322,236 B1 | | 11/2001 | Campbell et al. |
| 6,354,709 B1 | | 3/2002 | Campbell et al. |
| 6,436,218 B2 | | 8/2002 | Sher et al. |
| 6,540,367 B1 | | 4/2003 | Benson et al. |
| 6,581,286 B2 | | 6/2003 | Campbell et al. |
| 6,601,484 B1 | | 8/2003 | Katoh et al. |
| 6,715,386 B2 | * | 4/2004 | Maier ............................ 82/1.11 |
| 6,752,505 B2 | | 6/2004 | Parker et al. |
| 6,759,113 B1 | | 7/2004 | Tang |
| 6,918,326 B2 | | 7/2005 | Mitsuzono et al. |
| 6,942,432 B2 | | 9/2005 | Noggle et al. |
| 7,103,973 B2 | * | 9/2006 | Wolff et al. ............... 29/893.35 |
| 7,140,812 B2 | | 11/2006 | Bryan et al. |
| 7,199,930 B2 | | 4/2007 | Yao et al. |
| 7,212,345 B2 | | 5/2007 | Wilson |
| 7,216,407 B2 | * | 5/2007 | Yonemaru ..................... 29/27 C |
| 7,220,026 B2 | | 5/2007 | Ko et al. |
| 7,278,771 B2 | | 10/2007 | Campbell |
| 7,316,498 B2 | | 1/2008 | Olczak |
| 7,317,501 B2 | | 1/2008 | Tanaka et al. |
| 7,328,638 B2 | | 2/2008 | Gardiner et al. |
| 7,367,705 B2 | | 5/2008 | McCollum et al. |
| 7,416,372 B2 | * | 8/2008 | Hyatt et al. ................... 409/132 |
| 7,640,833 B2 | * | 1/2010 | Kimura ......................... 82/1.11 |
| 7,643,218 B2 | | 1/2010 | Wilson et al. |
| 7,677,146 B2 | | 3/2010 | Gardiner et al. |
| 7,757,591 B2 | | 7/2010 | Trice et al. |
| 7,891,856 B2 | | 2/2011 | Chuang et al. |
| 2002/0170396 A1 | | 11/2002 | Maier |
| 2003/0223830 A1 | | 12/2003 | Bryan et al. |
| 2004/0045419 A1 | | 3/2004 | Bryan et al. |
| 2004/0051948 A1 | | 3/2004 | Reed |
| 2004/0178528 A1 | | 9/2004 | Diehl et al. |
| 2004/0194596 A1 | | 10/2004 | Achelpohl |
| 2006/0283292 A1 | | 12/2006 | Iwabuchi et al. |
| 2007/0084315 A1 | | 4/2007 | Trice et al. |
| 2007/0084316 A1 | | 4/2007 | Trice et al. |
| 2007/0144315 A1 | | 6/2007 | Gardiner et al. |
| 2007/0251360 A1 | * | 11/2007 | Akiyama ....................... 82/53.1 |
| 2008/0055936 A1 | | 3/2008 | Wilson et al. |
| 2009/0038450 A1 | | 2/2009 | Campbell et al. |

FOREIGN PATENT DOCUMENTS

| | | | |
|---|---|---|---|
| DE | 33 12 484 | | 10/1983 |
| DE | 3234068 | | 10/1983 |
| DE | 42 31 021 A1 | | 3/1994 |
| DE | 43 13 533 A1 | | 10/1994 |
| DE | 4313533 A1 | * | 10/1994 |
| JP | 56-56317 | | 5/1981 |
| JP | 58 51010 | | 3/1983 |
| JP | 58-51010 | | 3/1983 |
| JP | 6-115781 | | 4/1984 |
| JP | 60-221202 | | 11/1985 |
| JP | 63-216651 | | 9/1988 |
| JP | 3-170223 | | 7/1991 |
| JP | 03170223 A | * | 7/1991 |
| JP | 3-184709 | | 8/1991 |
| JP | 2002-36004 | | 2/2002 |
| JP | 2002-160133 | | 6/2002 |
| JP | 2004-223836 | | 8/2004 |
| JP | 2006-198743 | | 8/2006 |
| KR | 2005-0108454 | | 11/2005 |
| WO | WO 00/48037 | | 8/2000 |

OTHER PUBLICATIONS

Bamberg, et al., "A Novel Micromilling Technology Based on Single-Point Tool Tip Geometry", presented at American Society of Precision Engineering Conference held on Oct. 15-19, 2007 in Dallas, Texas.

"Designing with Piezoelectric Transducers: Nanopositioning Fundamentals", Phyik Instruments, Sep. 2005, pp. 4-1 to 4-49.

Slocum, "Precision Machine Design", 1992, Table of Contents and Chapters 1-3, 5-7, 9 and 10.

Klocke et al., "New Potentials in Carbide Hobbing", Gear Technology, Jan./Feb. 2004, pp. 42-49.

* cited by examiner

FLY-CUTTING SYSTEM AND METHOD, AND RELATED TOOLING AND ARTICLES

RELATED APPLICATION

This application is a divisional of U.S. patent application Ser. No. 11/834,371, filed Aug. 6, 2007, now abandoned, which application is generally related to the subject matter of U.S. patent application Ser. No. 11/834,393, filed Aug. 6, 2007, the disclosure of which is incorporated by reference in their entirety herein.

TECHNICAL FIELD

The invention relates to machining systems and methods, and in particular to fly-cutting systems and methods and related tooling and articles.

BACKGROUND OF THE INVENTION

One method of machining grooves or other features into a workpiece is to use a rotating fly-cutting head to bring a cutting element into contact with the workpiece. The head and the workpiece can be moved relative to each other, which enables the cutting element to cut a long groove into the workpiece, for example. If the workpiece is a cylindrical roll, a fly-cutting head can cut a groove down the length of the outer surface of the roll, the roll can be indexed by a distance equal to the spacing or pitch between grooves, and then another groove can be cut down the length of the roll adjacent to the first groove. In this manner, an entire roll can be provided with longitudinal grooves to form a microreplication tool, which can in turn be useful for forming polymeric sheeting of the type used in displays, or as retroreflective sheeting, for example.

The invention relates to improvements in fly-cutting systems and methods for machining workpieces.

SUMMARY OF THE INVENTION

The present invention includes a number of aspects and embodiments, including a method for use in machining a workpiece, comprising the steps of (a) providing a fly-cutting head adapted for carrying a cutting element to machine the workpiece, and for rotation about a central axis; and (b) determining the position of the fly-cutting head with respect to the central axis as a function of time. The method may also include the steps of transmitting a position signal that includes information related to the position of the fly-cutting head as a function of time; providing a controller for receiving the position signal that includes information related to the position of the fly-cutting head as a function of time; using information obtained from the transmitted position signal to create a command signal; and transmitting the command signal to a motor that drives the fly-cutting head or to a motor that controls a spindle, to cause a change in the speed of either or both of them.

In another respect, the method of the present invention includes the steps of (a) providing a fly-cutting head adapted for carrying a cutting element, and for rotation about a central axis; (b) providing a spindle adapted for carrying the workpiece, and for rotation about a central axis; (c) determining the position of the fly-cutting head with respect to the fly-cutter central axis as a function of time; and (d) determining the position of the spindle with respect to the central axis of the spindle as a function of time.

In another embodiment of the method of the present invention, the method comprises the steps of (a) providing a fly-cutting head having a cutting element; (b) providing the cylindrical workpiece; (c) using the fly-cutting head to form an initial feature in the surface of the workpiece while the workpiece is rotated around a central axis of rotation, the initial feature having a major axis extending generally parallel to the axis of rotation for less than the length of the workpiece; (d) rotating the workpiece around a central axis of rotation; and (e) using the fly-cutting head to form a subsequent feature in the surface of the workpiece, the subsequent feature having a major axis extending generally parallel to the axis of rotation, wherein the subsequent feature is in predetermined location relative to the initial feature. The subsequent feature may be aligned with and adjoin the initial feature such that the two features approximate a single continuous feature.

In a further embodiment of the inventive method, the method includes the steps of (a) forming, beginning near a first end of the workpiece, an initial portion of each feature or groove; and (b) forming subsequent portions of each feature or groove during successive revolutions of the workpiece, the subsequent portions being substantially aligned with the initial portion of each feature or groove, the subsequent portions being formed progressively closer to a second end of the workpiece. This method can result in the formation of the initial portions of the features or grooves near the first end of the workpiece that are relatively sharper than the subsequent portions of the features or grooves formed closer to the second end of the workpiece.

A tool, such as a microreplication tool, made using one or more of the methods described above is also a part of the present invention. Articles, such as a polymeric article, made using such tools are also within the scope of the present invention, as are those polymeric articles in combination with a display such as a television or a computer display.

Other tools may be provided according to the present invention, including the following: a cylindrical tool comprising a plurality of groove segments individually formed around the perimeter of the tool, the groove segments being aligned with other groove segments to form generally uniform longitudinally-extending grooves in the tool; a cylindrical tool having longitudinally-extending features or grooves extending from a first end toward a second end, wherein portions of the features or grooves nearest the first end are all relatively sharper than the corresponding portions of the features or grooves near the second end; or a cylindrical tool having longitudinally-extending grooves extending from a first end toward a second end, wherein the tool is characterized by the absence of a virtual seam along which a sharp groove is adjacent to a less sharp or dull groove. In certain additional embodiments, the tool may be a cylindrical tool having groove segments formed therein, wherein the groove segments have a beginning and an end, and the groove segments are arranged according to an integer brick pattern, wherein the integer is greater than one.

A further tool provided according to the present invention is a cylindrical tool having groove segments formed therein, wherein the groove segments have a beginning and an end, and successive groove segments are offset with respect to previous groove segments by a helix angle, as well as a cylindrical tool comprising a plurality of groove segments, wherein the groove segments are individually formed in positions relative to each other, and wherein the groove depth distribution of successive adjacent grooves, measured along a line that is parallel to any helix angle associated with the groove segments, is multi-modal.

The present invention includes articles, such as polymeric articles, made using the tools described above, as well as those polymeric articles in combination with a display such as a television or a computer display.

DESCRIPTION OF THE DRAWINGS

The various aspects of the present invention will be described below with reference to the appended Figures, in which.

DETAILED DESCRIPTION OF THE INVENTION

Figure 1:
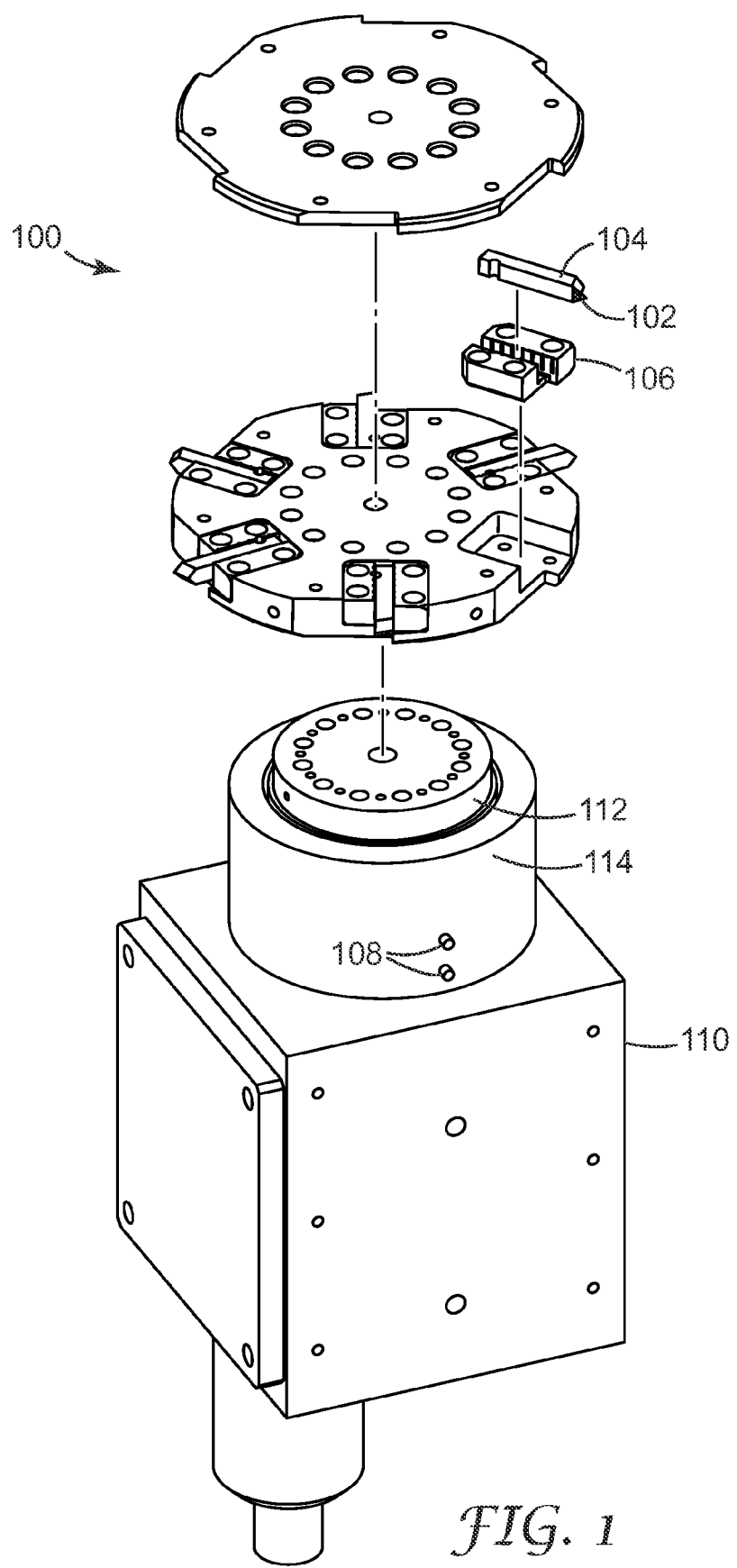
FIG. 1 is an exploded view of a fly-cutting head according to the present invention.

In conventional fly-cutting operations, a fly-cutter is positioned relative to a workpiece, a motor is activated to rotate the head and the associated cutting element or elements, and the fly-cutting head is moved relative to the workpiece to cut a groove or other feature into the workpiece. Fly-cutting, which is a type of milling, is typically a discontinuous cutting operation, meaning that each cutting element is in contact with the workpiece for a period of time, and then is not in contact with the workpiece for a period of time during which the fly-cutting head is rotating that cutting element through the remaining portion of a circle until it again contacts the workpiece. Although a fly-cutting operation is typically discontinuous, the resulting groove segment or other surface feature formed in a workpiece by the fly-cutter may be continuous (formed by a succession of individual, but connected cuts, for example) or discontinuous (formed by disconnected cuts), as desired. The present invention is described most often in the context of removing material from a workpiece by fly-cutting using a cutting element, but the present invention also includes within its scope the practice of peening or otherwise deforming a surface using a modified fly-cutting head equipped with peening elements rather than cutting elements.

As noted above, the feature(s) cut into the workpiece using conventional fly-cutting may be a groove, formed by the sequential groove segments made by the cutting elements as the head rotates, that extends along the length of the workpiece. In this arrangement, it is not important to know where an individual cutting element is relative to the axis of rotation of the fly-cutting head, because the cutting element simply continues to cut material from the workpiece until it is moved away from the workpiece, or the motor is stopped. Another example of a similar arrangement is when a fly-cutter is used to cut a helical groove into the surface of a cylindrical workpiece—a process that is said to produce threads, or screw threads, in the workpiece. In that situation as well, the position of any individual cutting element relative to the axis of rotation of the fly-cutting head is unimportant, because the cutting elements once positioned relative to the workpiece simply continues to cut that workpiece until they are stopped. In other words, if the point at which a cutting element first contacts the workpiece is said to be 0 degrees (relative to the axis of rotation of the fly-cutter head), it is not important to know whether a cutting element is located at 5 degrees, 165 degrees, or 275 degrees of rotation around the axis of rotation at any point in time.

A feature of the present invention is related to the determination of the position of a fly-cutting head as a function of time. This information is useful for fly-cutting operations in which the fly-cutting head is to be positioned to form a feature, such as a groove segment, in a workpiece in a specified position relative to the workpiece or other features, or both. The position determination may be absolute, meaning that the rotational position of the fly-cutting head is known relative to some initial or reference point, or relative, meaning that the rotational position of the fly-cutting head is known relative to some previous position. For example, using the simple angular position descriptions provided above, the present invention enables a user or a system to determine that at a first point in time ($t_1$), the cutting element was at a first angular position ($a_1$), that at a second point in time ($t_2$) the cutting element was at a second angular position ($a_2$), and so on. If the angular positions are specified as the positions at which, for example, a cutting element first contacts a workpiece (at position $a_1$), and the position at which a cutting element has cut a known portion of a groove or other feature into the workpiece (position $a_2$), then a fly-cutting head equipped with an actuator for changing the position or the orientation of a cutting element, or both, between position $a_1$ and position $a_2$ can be activated to do so. In short, knowing the position of the cutting element as a function of time permits an operator to specify the position of that cutting element at any point in time, which can enable the system to form predetermined patterns, structures, grooves, cuts, designs, or, generically, features in a workpiece. This is believed to be an advantage that is not available in conventional fly-cutting systems or methods.

The present invention will be described first with reference to a fly-cutting head, then a fly-cutting system that includes such a fly-cutting head. Finally, various operational features and the results of the present invention will be described, particularly in regard to forming tooling or an article made using such a tool.

In the fly-cutting system and method of the present invention, one embodiment of which is shown in FIG. 1, the fly-cutting head 100 includes cutting elements 102 that are retained by or incorporated into shanks or tool holders 104, which may in turn be affixed to head 100 by cartridges 106. The cutting element may be a diamond, for example, that is carried by a tool holder 104. Alternatively, a cutting element such as a diamond may be bonded directly to a fly-cutting head or disc, and used to form features in a workpiece.

The fly-cutting head includes a housing 110 that is normally secured to a base or platform, a motor such as a DC motor that includes a stator (not shown) that is affixed to the housing, and a rotating spindle 112 that is supported by an air-bearing 114, which may include ports 108, for example. The fly-cutting head may also include a slip-ring or other assembly for transmitting signals or power or both between stationary and rotating portions of the head. The fly-cutting head also includes an encoder, such as rotary encoder that measures the position (or change of position) of the rotating spindle relative to the housing 110. One part of the encoder is typically stationary, and is in a fixed position relative to (and typically contained within) the housing or the stator or both. A second part of the encoder is typically affixed to a rotating portion of the fly-cutting head such as spindle 112, and it is adapted to interact with the stationary part of the encoder to produce a signal that indicates relative movement between the two parts. For example, the rotating part of the encoder may have a series of lines or other indicia, and the stationary part of the encoder may optically detect the presence or absence of those lines in order to determine the extent of the relative motion between the two parts. The encoder (the stationary part, typically) then transmits at least one position signal that includes information regarding the position of the fly-cutting head, which can be received by a controller and used to create command signals. The command signals may be transmitted to the motor associated with the fly-cutting head or platform, for example. Command signals may change the speed of the fly-cutting head, or its location relative to the workpiece, for example.

Although in the present description reference may be made to a single cutting element that is carried by a fly-cutting head, multiple cutting elements may be carried by the fly-cutting head, and the cutting elements may be identical to or different from each other. The cutting elements may be single or polycrystalline diamond, carbide, steel, cubic boron nitride (CBN), or of any other suitable material. Suitable diamond cutting tips are available from the K&Y Diamond Company of Quebec, Canada. The geometry of a cutting element such as a diamond, and the design of a shank or holder for the cutting element, may be specified to create the surface features or effects desired for a workpiece. The cutting element, which is typically replaceable, may include more than one cutting tip, or other features, as described for example in U.S. Patent Publication No. 2003/0223830 (Bryan et al.), the contents of which is incorporated herein. Diamond cutting elements can be milled on a sub-micron scale, including for example by ion-milling, to create cutting elements that will form features of almost any desired configuration. Other characteristics of the fly-cutting head can be selected as desired. For example, a larger diameter fly-cutting head can be used to create grooves that naturally have a flatter bottom, due to the larger cutting radius, than grooves cut by a smaller diameter fly-cutting head.

Figure 2:
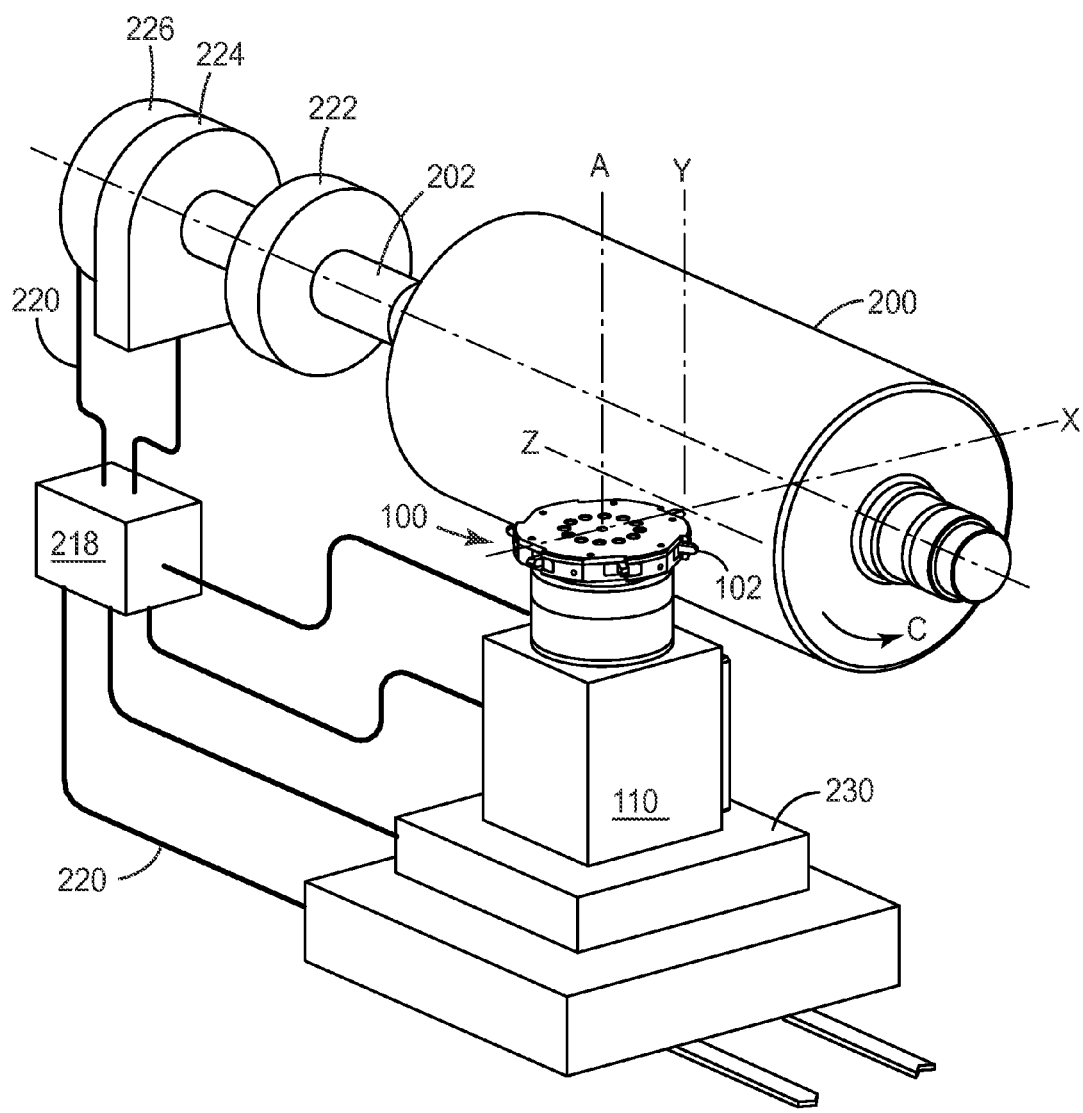
FIG. 2 is an elevational perspective view of a fly-cutting system according to the present invention.

A fly-cutting system in accordance with the present invention is illustrated in FIG. 2. For ease of description, a coordinate system may be designated with regard to the fly-cutting head 100 and a workpiece 200. The coordinate system designations are arbitrary, and provided to facilitate an understanding of the present invention in the context of the drawings provided, rather than to limit the scope of the invention. The coordinate system is shown relative to the tip of the cutting element, and includes mutually orthogonal X, Y, and Z axes. The X axis is perpendicular to roll 200, and in the illustrated embodiment passes through the longitudinal axis of roll 200. The Y axis extends vertically, as shown in FIG. 2, and in the illustrated embodiment is parallel to or coincident with a tangent to the outer surface of the roll. The Z axis extends horizontally and parallel to the central axis of the roll. The workpiece, in the illustrated embodiment, also has a rotational axis C, and the workpiece may be rotated in either direction with respect to that axis. The fly-cutting head 100 has an axis of rotation A, which is parallel to the Y axis in FIG. 2. Although the illustrated workpiece is a cylindrical roll, and the designation of a workpiece and a roll may be used interchangeably in this description where the specific shape of the workpiece is unimportant, workpieces of other shapes and sizes may be used in connection with the present invention. If the workpiece is planar (such as a plate or disc) rather than cylindrical, then corresponding adaptations in the preceding designations of the various axes may be made to facilitate an understanding of the invention in that context.

Figure 3:
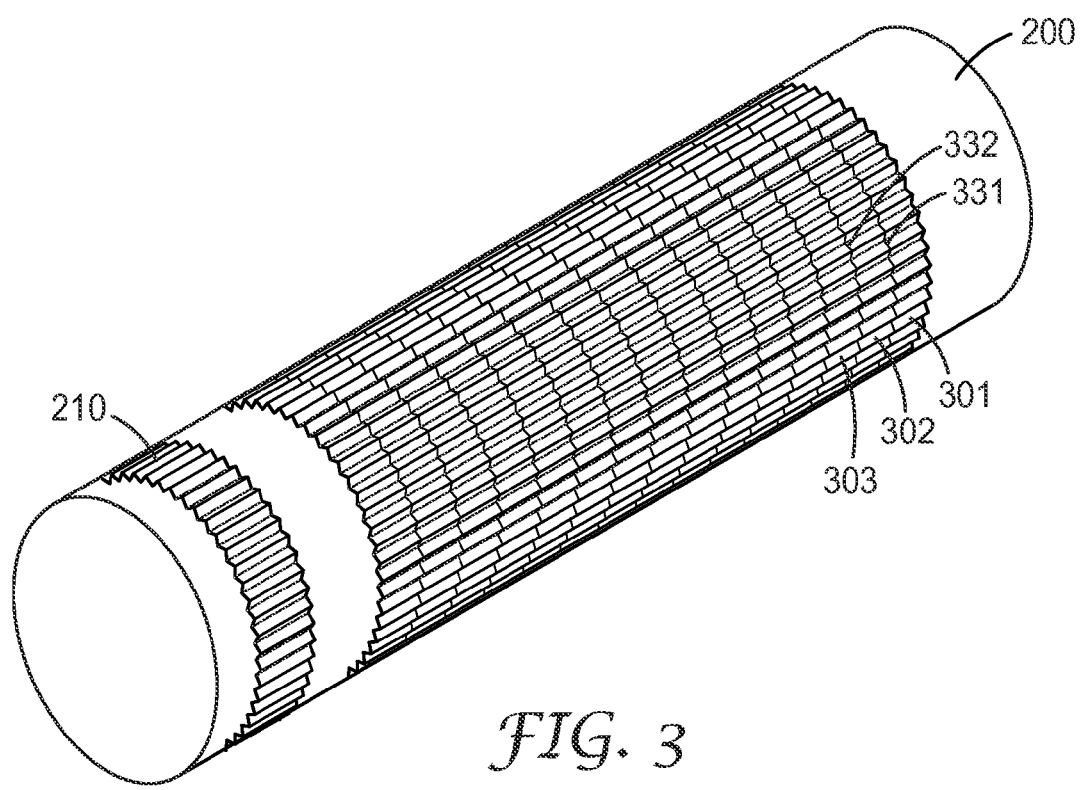
FIG. 3 is an example of a workpiece or roll having groove segments or features formed in the outer surface.

In this embodiment, a cylindrical workpiece 200 is fixedly supported on a spindle 202, and an encoder 226 is positioned and adapted to detect the position or change in position of the spindle relative to a fixed or initial point. The workpiece may be a roll 200 made of metal, such as stainless steel, with an outer layer made of a material that is more easily tooled, such as brass, aluminum, nickel phosphorus, hard copper, or polymer. For simplicity, the workpiece will often be referred to in this description as a "roll," but the workpiece could with suitable adaptations to the system be planar, convex, concave, or of a complex or other shape. Accordingly the term "roll" in this description is intended to exemplify workpieces of any suitable shape. The workpiece may include a test band 210 at one end, as shown in FIG. 3, on which the fly-cutting head can be programmed to cut a test pattern to determine whether the head and the workpiece are positioned and synchronized appropriately relative to each other. The characteristics of the features formed in the test band can then be evaluated, and once the operation of the fly-cutting head and the workpiece have been optimized, the actual machining operation can be performed on a different portion of the workpiece. Test bands are not required, but they may be useful for determining what adjustments may have to be made to cause the actual performance of the system to match the desired or theoretical performance of the system.

The fly-cutting system is preferably controlled by a computer or controller 218, which may include or be operatively connected to memory for storing one or more applications, secondary storage for non-volatile storage of information, a function generator for generating waveform data files that can be output to an actuator or other device, an input device for receiving information or commands, a processor for executing applications stored in memory or secondary storage or received from another source, a display device for outputting a visual display of information, or an output device for outputting information in other forms such as speakers or a printer, or any combination of two or more of the foregoing. The controller may exchange data or signals using cables 220, or a suitable wireless connection. One useful control system includes input and output circuitry, and a PMAC control, available from Delta Tau Data Systems of Chatsworth, Calif. That PMAC control combines a multi-axis PMAC2 controller with amplifiers to provide motion control of, for example, the flycutting head and the roll.

The control system of the present invention uses software or firmware or both that can be designed in a manner known to produce the results described herein. Specifically, the software preferably enables an operator to create waveform data files that represent both the micro-level shape of an individual groove segment or other surface feature, and a macro-level pattern (random, pseudo-random, or regular) of groove segments or other features on the workpiece. Those data files are then communicated to the various control system components to control the performance and preferably the synchronization of the cutting elements relative to the workpiece.

To program and coordinate the movement of the various components, software is typically used to input the desired parameters to create data files, and a wave generation unit then translates the data files into signals that are transmitted to the drive unit(s), actuator(s) and other components as required. For example, the roll speed may be set at from approximately 0.001 to approximately 1000 revolutions per minute, and the fly-cutting head speed may be set at from approximately 1000 to approximately 100,000 revolutions per minute. Fly-cutting head speeds of approximately 5000, approximately 10,000, approximately 25,000 revolutions, and approximately 40,000 revolutions per minute have been tested, and are generally preferred because higher speeds reduce the time required to create a finished workpiece, such as a microreplication tool.

The workpiece—roll 200 in the illustrated embodiment—may be fixedly supported on a spindle system that is driven by a motor that is controlled by and receives command signals from the controller. The spindle system may include one or more bearings 222, such as air or hydrostatic bearings. For simplicity, bearings 222 are shown at only one end of the roll in FIG. 2, and are not shown in FIG. 4, although they may be positioned and supported in any suitable location with respect to a workpiece. The roll may be rotated in either direction by a motor 224 or, if the workpiece is not cylindrical or is positioned using a different system, positioned in response to instructions provided by the controller 218. An exemplary motorized spindle system is available from Professional Instruments of Hopkins, Minn., under the designation 4R, or under the designation 10R (which includes an air bearing), or, for larger workpieces, an oil hydrostatic spindle system from Whitnon Spindle Division, Whitnon Manufacturing Company, of Farmington, Conn. The spindle system preferably also includes a rotary encoder 226 that is adapted to detect the position of the workpiece to within a desired degree of accuracy, and to transmit that information to the controller to enable the controller to synchronize the workpiece and the fly-cutting head in the manner described below.

The fly-cutting head is preferably supported on a fly-cutting table 230, as shown in FIG. 2, which may be referred to as an "x-table." The x-table is adapted for movement along at least one of the X, Y, and Z axes, preferably along both the X and Z, and more preferably along all three of the X, Y, and Z axes sequentially or preferably simultaneously, to position the fly-cutting head and the cutting element(s) relative to the workpiece. As is known in the art, the x-table can move in more than one dimension or direction essentially simultaneously, so that the location of the cutting tip can be easily positioned in three-dimensional space under the control of the controller.

Other conventional machining techniques may useful in connection with the inventive system and its components. For example, cooling fluid may be used to control the temperature of the cutting elements, the fly-cutting head, the actuators, or other components. A temperature control unit may be provided to maintain a substantially constant temperature of the cooling fluid as it is circulated. The temperature control unit and a reservoir for cooling fluid can include pumps to circulate the fluid through or to the various components, and they also typically include a refrigeration system to remove heat from the fluid in order to maintain the fluid at a substantially constant temperature. Refrigeration and pump systems to circulate and provide temperature control of a fluid are known in the art. In certain embodiments, the cooling fluid can also be applied to the workpiece to maintain a substantially constant surface temperature while the workpiece is being machined. The cooling fluid can be an oil product, such as a low-viscosity oil.

Other aspects of the machining process are also known to persons of skill in the art. For example, a roll may be dry-cut, or cut using oil or another processing aid; high-speed actuators may require cooling; clean, dry air should be used with any air bearings, such as those that support the spindle; and the spindle may be cooled using an oil cooling jacket or the like. Machining systems of this type are typically adapted to account for a variety of parameters, such as the coordinated speeds of the components and the characteristics of the workpiece material, such as the specific energy for a given volume of metal to be machined, and the thermal stability and properties of the workpiece material. Finally, certain diamond-turning components and techniques of the type described in PCT Publication WO 00/48037, and fly-cutting components and techniques of the type described in U.S. Patent Publication 2004/0045419 A1 (Bryan et al., which is assigned to the assignee of the present invention), the contents of both of which are incorporated herein by reference, may also be useful in the context of the present invention.

The position of the workpiece 200 as a function of time is determined, for example in the case of a cylindrical roll by using an encoder 226 associated with a spindle on which the roll is fixedly mounted for rotation about a longitudinal axis of rotation. The encoders used for the fly-cutting head, and for the spindle or other workpiece support system, may be used not only for purposes of measuring speed, as with some conventional encoders used with fly-cutting systems, but to measure position. Then encoder can then transmit a position signal indicative of the position of the fly-cutting head or the spindle, respectively. This assists in synchronizing the positions of the workpiece and the cutting element(s) of the fly-cutting head. Specifically, encoders may be provided to determine the rotational position of a roll, the position of the fly-cutting head with respect to its axis of rotation of the head, the position of the fly-cutter head with respect to another axis such as the Z axis, and the position of an x-table that moves the fly-cutter with respect to the roll. Accordingly, although the term "determining the position" of the fly-cutting head will commonly be used with reference to determining its position during rotation of the head, it may additionally include determining the position of the fly-cutting head with respect to its axial position along or rotational position around an axis. In general, the fly-cutting head may be angled with respect to, or rotated around (or tilted with respect to), any axis.

In one embodiment, this synchronization may be done by providing a position encoder (such as an angular encoder) associated with the roll and another position encoder associated with the fly-cutting head. At least two types of encoders are currently available—incremental and absolute. Incremental encoders may be less expensive, and if used with an index signal that is indicative of a known position of the roll or the fly-cutting head, for example, may function effectively as an absolute encoder. The encoder 226 associated with the roll (or the spindle on which the roll is mounted) should have a resolution sufficient to detect the position of the roll along its axis of rotation to within a fraction of the desired groove pitch or other dimension of the features being machined into the roll. The groove pitch is the distance from the center of one groove to the center of the next adjacent groove, or the distance from one peak to the next adjacent peak, and a corresponding dimension can normally be calculated for other surface features.

One encoder useful in connection with the flycutting head in certain embodiments of the present invention is available from U.S. Digital Corp. of Vancouver, Wash., under the designation E5D-100-250-I, and it is positioned on the flycutting head to measure the angular position of the head. An encoder that is useful in connection with the workpiece or roll in certain embodiments of the present invention is available from Renishaw Inc. of Hoffman Estates, Ill., under the designation Renishaw Signum RESM, 413 mm diameter, 64,800 line count. The particular encoder(s) selected for an application depends on the desired resolution, maximum speed of the fly-cutting head or other component, and the maximum signal speed.

Although the features cut into a workpiece by the cutting elements may be referred to for convenience as a "groove segment" or a "groove," other surface features may be formed by the cutting elements if desired. The depth of the features cut into a workpiece surface may be in the range of 0 to 150 microns, or preferably 0 to 35 microns, or even more preferably for creating microreplication tools for optical films, 0 to 15 microns. These ranges are not intended to limit the scope of the invention, but they may represent the scale of features useful for providing certain optical effects in polymeric sheeting produced using such a tool. For a roll workpiece, the length of any individual feature is influenced by the speed at which the roll rotates around its longitudinal axis, because it is more difficult to cut a long feature into a roll moving at a higher speed. If the cutting elements are moving in the opposite direction of the workpiece, longer grooves may generally be formed more easily than if the cutting elements are moving in the same direction as the workpiece. The feature can have almost any length, for example if the fly-cutting head of the present invention is used to create a feature approximating a thread cut around the perimeter of a cylindrical roll. If individual features are desired, their length may be from about 1 micron to several millimeters, for example, although this range is not intended to limit the scope of the present invention. For thread-cutting, the pitch or spacing between adjacent grooves can be set at from about 1 to about 1000 microns. The features can have any type of three-dimensional shape such as, for example, symmetrical, asymmetrical, prismatic, and semi-ellipsoidal features. In embodiments in which the material on the surface of a workpiece is indented or otherwise deformed instead of being removed, the deformation can be changed by changing the characteristics of the tool carried by the tool holder.

The surface features that are cut into a workpiece in accordance with the present invention can be controlled on both a macro-scale and on a micro-scale. Surface features or microstructures can include any type, shape, and dimension of structures on, indenting into, or protruding from the surface of an article. For example, microstructures created using the actuators and system described in the present specification can have a 1000 micron pitch, 100 micron pitch, 1 micron pitch, or even a sub-optical wavelength pitch around 200 nanometers (nm). Alternatively, in other embodiments, the pitch for the microstructures can be greater than 1000 microns. These dimensions are provided for illustrative purposes only, and features or microstructures made using the actuators and system described in the present specification can have any dimension within the range capable of being tooled using the system.

In cases in which the workpiece is a cylindrical roll that is rotating around its longitudinal axis, a flycutting head that is arranged to cut a groove or succession of grooves parallel to that axis may need to be re-oriented so that the resulting groove or succession of grooves is actually parallel. In other words, if the cutting element would cut a parallel groove in the roll when the roll is stationary, then it would (if other parameters were held constant) cut a slightly curved groove in the roll if the roll is permitted to rotate during the cut. One way to offset this effect is to angle the cutting head so that the cutting element at the end of its cut is farther in the direction of rotation of the roll than at the beginning of its cut. Because the cutting element is in contact with the roll over only a short distance, the result can be to approximate a parallel cut in the roll surface notwithstanding the rotation of the roll. It may be possible to adapt the system in other ways to accomplish the same or a similar objective, for example by enabling the flycutting head to rotate around the central axis of the roll so that it follows the roll as it rotates, although this may be expensive to implement.

In one useful system and method for machining a workpiece, such as the cylindrical workpiece 200 shown in FIG. 2, the fly-cutting head is positioned with its axis of rotation A extending parallel to the Y axis, so that grooves or features that extend parallel to the Z axis are cut into the surface of the workpiece. However, rather than cut an entire groove down the length of the workpiece, a single groove segment is cut and the workpiece is rotated by an distance (at the outer surface) equal to the desired pitch, or distance, between the desired location of adjacent grooves. Then a second groove segment is cut, and the workpiece rotated by a second distance equal to the pitch between the desired location of the next adjacent grooves. This process is repeated until groove segments have been formed around the perimeter of the workpiece. When the workpiece has been rotated through an entire revolution, the controller (because it has received the position signals sent by the encoder associated with the workpiece) can precisely align groove segments cut into the workpiece during the steps in a successive revolution with the groove segments cut in steps in a preceding revolution, to form the equivalent of longitudinally-extending grooves or other desired structures in the outer surface of the workpiece. However, longitudinally-extending grooves are just one of several possible features that may be formed in or on a workpiece. In a preferred embodiment described in greater detail below, the rotation of the workpiece, the rotation of the fly-cutting head, and the displacement of the fly-cutting head in the Z direction are coordinated and relatively constant, which minimizes wasted time in starting, stopping, or repositioning a component, or waiting for that component to reach a steady operating state.

To form a microreplication tool according to the present invention, a workpiece such as a cylindrical roll is milled to provide the desired surface features. The blank roll may have an outer layer into which structures or patterns will be cut. That layer, after it has had a random or other pattern cut into it, may in turn be coated with one or more additional layers that protect the pattern, permit accurate formation of a film or its easy release, or perform other useful functions. For example, a thin layer of chrome or a similar material may be applied to the tool, although a layer of that type may "round over" sharp edges of the tool and therefore be undesirable. Any machineable materials could be used; for example, the workpiece can be made of aluminum, nickel, copper, brass, steel, or plastics (such as acrylics). The particular material to be used may depend, for example, upon a particular desired application such as various films made using the machined workpiece.

FIG. 3 illustrates an idealized workpiece 200, in which individual groove segments 301 have been formed by fly-cutting during a first revolution of the workpiece, after which groove segments 302 have been formed during a second revolution, after which groove segments 303 have been formed during a third revolution, and so on. The groove segments formed during the second and subsequent revolutions are aligned with the groove segments formed during the first revolution, and the result is a set of features approximating longitudinal grooves extending between a first end and a second end. It is possible to extend the groove segments and resulting grooves across the entire length of the workpiece, but it may be desirable to leave areas on each end of the roll blank, for the formation of test bands or for other purposes.

Although cutting successive groove segments into a workpiece around its perimeter is believed to have certain advantages when compared to conventional fly-cutting operations, the visual appearance of the areas of the workpiece where successive groove segments overlap may be undesirable. These feature overlaps are shown at 331 (where groove segments formed during the second revolution overlap with groove segments formed during the first revolution), 332 (where groove segments formed during the third revolution overlap with groove segments formed during the second revolution), and so on along the length of the roll. If these feature overlaps are visually perceptible on the workpiece, then they are likely to result in corresponding visibly perceptible structures on a film or sheeting formed on the workpiece, which can also be undesirable. Even if the feature overlaps are not easily visibly perceptible, it may be desirable to minimize or eliminate them to improve the optical performance of articles made on the tool. Methods of minimizing this effect are described in greater detail below.

The position of the fly-cutting head is determined using encoder, as noted above, and the position of the spindle on which the workpiece is carried is similarly determined using an encoder shown at 226 in FIG. 2. Because the cutting elements are typically in a fixed position relative to the fly-cutting head, and the workpiece is typically in a fixed position relative to the spindle, knowing the position of the fly-cutting head and the spindle essentially enable an operator to know the position of the cutting elements and the workpiece. Data from those encoders is fed into controller 218, as shown in FIG. 2, which can in turn transmit command signals to the motor that creates the rotary motion of the fly-cutting head, or the motor that creates the Z-axis motion of the fly-cutting head, or the motor that creates the rotational motion of the spindle on which the workpiece is carried, or more than one of the foregoing, for example. When the relationship between the position of the fly-cutting head and the workpiece has been determined, the fly-cutting head may be said to be electronically "geared" to the workpiece, because no actual mechanical gearing between the two pieces exists. When a fly-cutting head is electronically geared to a workpiece according to the present invention, the controller can determine when in the orbit of a cutting element it strikes the workpiece, and where on the workpiece it strikes. In a further aspect of the invention described in detail in the copending United States Patent Application first mentioned and incorporated by reference above, a user can also cause the controller to change the position or orientation of a cutting element relative to the fly-cutting head if the cutting element is connected to an actuator capable of creating such motion. For example, a user may program the controller to create a groove segment with an essentially linear bottom in a workpiece, by activating an actuator that can change the position of the cutting element thousands of time per second so that it follows a predetermined cutting path.

When the positions of both the fly-cutting head and the workpiece are controlled, in practice one is normally set to rotate at a fixed or predetermined speed and the other is geared to it (e.g. slowed down or speeded up) so that the two are in the correct positions relative to each other. Because the fly-cutting head operates at several thousand revolutions per minute, it has a considerable amount of energy, inertia, and/or momentum, and it may not be practical to attempt to speed up or slow down the head to match the position of the workpiece. Instead, the fly-cutting head may be programmed to rotate at essentially a fixed rate, and the spindle on which the workpiece or roll is carried may be speeded up or slowed down so that the cutting element and the workpiece are in the proper positions relative to each other. This system may be referred to as one in which the fly-cutting head is the "master," and the workpiece and its corresponding spindle are "slaved" to it. The reverse is also possible—slaving the fly-cutting head to the workpiece—as is a third embodiment in which the rotation of the fly-cutting head, the rotation of the workpiece, and the Z-axis motion of the fly-cutting head are all under synchronized control. Experimental testing of the fly-cutting system on the test strip part of the workpiece is typically helpful in determining whether the head and the workpiece are appropriately geared together to produce the desired results.

Figure 4:
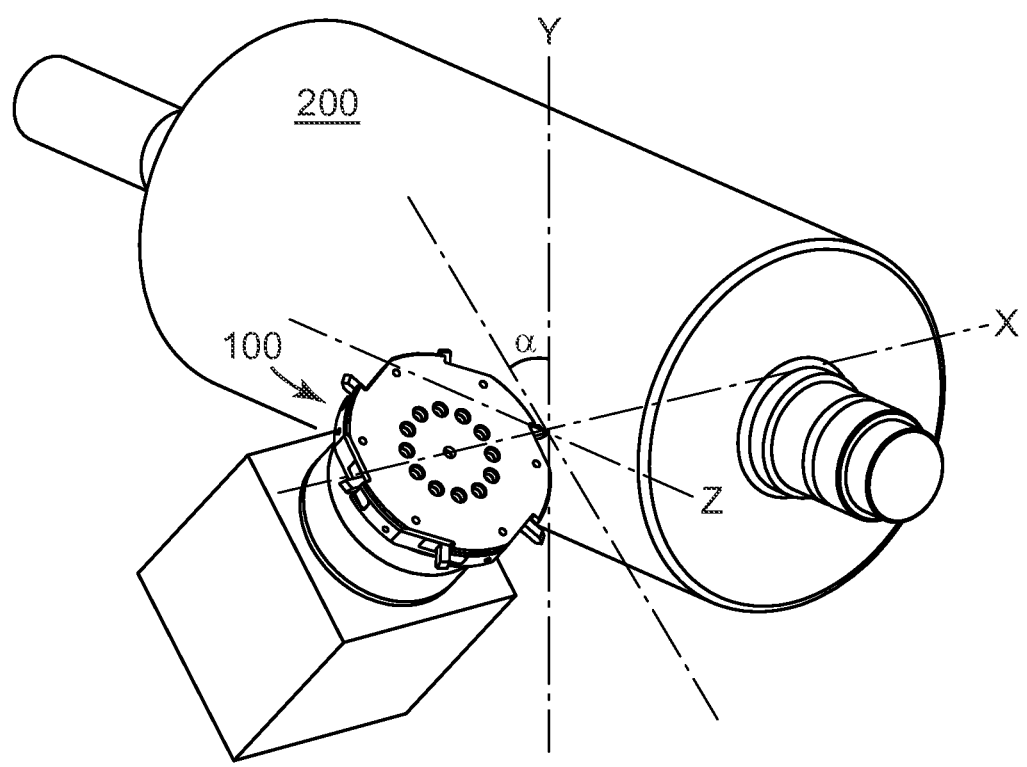
FIG. 4 is an elevational perspective view of a fly-cutting head and a workpiece or roll, in which the head is inclined relative to the roll.

Certain relatively simple applications of the present invention are described above, in which grooves or features parallel to the Z axis are formed in or on a workpiece. A variation of the same approach is to form grooves or features in a workpiece at an angle to the Z axis, for example by turning the fly-cutting device 45 degrees relative to its position in FIG. 2, as shown in FIG. 4, or turning the head 90 degrees relative to its position in FIG. 2, or at any other orientation. Tooling may be created with linear grooves positioned at any angle relative to the workpiece, or with non-linear features or even features that intersect each other. Other angular arrangements are also possible, including sets of parallel grooves cut at different angles to produce prisms or other microstructures on the roll or workpiece surface.

Forming grooves or features in a predetermined pattern in a workpiece at an angle to both the Y and Z axes is more complex than forming them parallel to the Z axis. It is more complex because the fly-cutting head is not simply advanced a fixed distance in the Z direction for each revolution of the workpiece to form the next groove, as with some of the other embodiments noted above. Instead, the Z-direction travel of the fly-cutting head for each rotation of the workpiece should be analytically or experimentally determined, so that on successive rotations of the workpiece subsequent groove segments are aligned with earlier groove segments if aligned groove segments are desired. For example, if a series of 45 degree groove segments are formed around the perimeter of the roll, each be slightly advanced in the Z direction relative to the previous segment, then after a complete revolution of the roll the groove segments formed during a second revolution would be parallel to the ones formed during the first revolution, but not necessarily aligned end-to-end with them. One solution to this problem is to calculate the distance by which, after a complete revolution of the roll, the groove segments formed during a second revolution should be adjusted in order to make them align end-to-end with the segments formed during the first revolution. That distance may then be divided by the number of groove segments formed during a single revolution, and the resulting fraction added to the pitch between each successive groove segment so that after a full revolution of the workpiece, the groove segments formed during the second revolution have effectively precessed by the desired distance with respect to the groove segments formed during the first revolution. The same process can be used with successive revolutions.

The fly-cutting head may be angled with respect to one or more than one of the illustrated axes, and may also or instead be rotated around one or more than one of the axes, so that the cutting elements strike the workpiece in a predetermined position and orientation. For example, the fly-cutting head could be rotated 90 degrees around the X axis relative to FIG. 2, so that it is aligned with the Y axis, and then it could be rotated around the Y axis at for example a 45 degree angle so that the cutting elements strike the workpiece in a certain manner.

The ability to form grooves at an angle with respect to the longitudinal axis of a cylindrical workpiece is an advantage relative to conventional cylindrical tools that include essentially linear grooves parallel or perpendicular to the longitudinal axis of the tool. This is because a user who wishes to use sheeting so that the grooves are at a 45 degree angle relative to the sides of the sheet would normally need to die-cut that sheeting at an angle from a larger piece of sheeting having grooves extending longitudinally or laterally. This can result in significant waste near the sides of the larger piece of sheeting. With the present invention, sheeting having grooves extending at a 45 degree angle (or any other selected angle) relative to the sides of the sheeting can be directly formed on a tool, with minimal waste along the sides of the sheeting when the sheeting is cut for use.

Figure 6:
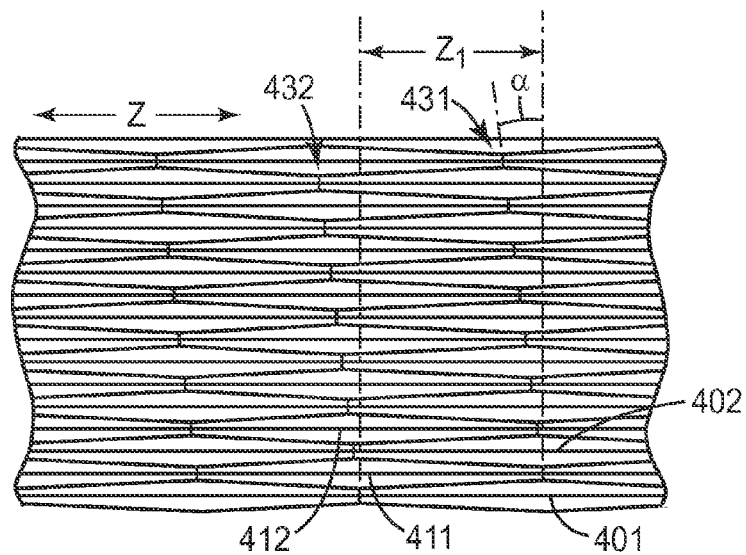
FIGS. 6 through 8 are plan views of exemplary patterns of features or groove segments formed in a surface of a workpiece.

FIG. 6 illustrates a simplified illustration of the formation of groove segments or other features in predetermined patterns on a surface of a workpiece. In this view, groove segments are cut by a cutting element at a certain radius from the axis of rotation of the fly-cutting head, so the groove segments are relatively narrow and shallow at the point where the cutting element enters the workpiece to start forming a groove segment, wider and deeper at the point where the cutting element is at the midpoint of the groove segment, and narrow and shallow again at the point where the cutting element exits the workpiece at the end of a groove segment. If the cutting element is associated with an actuator that can change the position of the cutting element relative to the fly-cutting head, other features with different characteristics can be created.

In this aspect of the invention, a fly-cutting head forms a groove segment or feature at a first location 401, the workpiece is rotated by a predetermined amount (1.0 degrees, for example), another groove segment or feature 402 is formed, the workpiece is rotated by the same amount, and this operation is repeated until the workpiece had been rotated 360 degrees—an entire revolution. During the next revolution of the workpiece, a groove segment 411, located at a distance $Z_1$ along the workpiece toward the far end of the roll, is formed at a point between the features previously cut into the workpiece—for example at a rotational position of 0.5 degrees relative to the rotational position of the groove segment 401. Then the workpiece is rotated (again by 1.0 degrees, for example) and a groove segment 412 is formed, and so on around the workpiece for an entire revolution. The features cut into a workpiece during a third revolution are aligned with the features cut in the first revolution; the features cut during a fourth revolution aligned with those cut in the second revolution, and so on. This might be referred to as a "two-brick" pattern, because it is similar to the offsetting of a second course of bricks laid atop a first course of bricks by the distance of ½ of the length of an individual brick. The result is to decrease the visual significance of feature overlaps if all grooves ended and began along a single line, because in this embodiment features end and begin along lines 431 and 432, for example. The creation of patterned features in a workpiece using a fly-cutting head in the manner described above is one important benefit of the ability to determine the location of the cutting element as a function of time.

Although the workpiece shown in FIG. 6 has been described for purposes simplicity as groove segments formed in a succession of 1 degree advances, followed by a 0.5 degree advance at the end of the first revolution, followed by a further succession of 1 degree advances around a roll, a different process that avoids the necessity of an unequal intermediate step may be preferable. In that process, the desired offset or advance after a complete revolution (0.5 degrees, in the example) is divided by the number of groove segments formed during a revolution to determine an incremental advance to be added to the pitch between each successive groove segment formed during a first revolution. The result of that incremental advance for each groove segment, after a complete revolution, is to advance the pattern by a total of 0.5 degrees, in the example. This process allows the fly-cutting head and the workpiece to be moved with constant velocities, instead of having a discontinuous short step or long step at the end of each revolution.

The groove segments or features shown in FIG. 6 can be formed in a roll following a "helix angle" α, so that each successive groove segment is offset in the Z direction relative to the previous segment. The helix angle may be selected so that after a complete revolution of the roll, the groove segments or features have advanced by the length of one groove segment. FIG. 6 illustrates what might be referred to as a two-brick pattern that includes a helix angle. Each successive groove segment or feature formed during a revolution is offset in the Z direction by a helix angle alpha (α) relative to the preceding groove segment or feature. The helix angle is selected so that after one full revolution of the workpiece, the first groove segment or feature formed in the second revolution is displaced by a desired distance in the Z direction relative to the groove segments or features formed in the first revolution. The positions of the groove segments or features formed during the second revolution can thus be interleaved between the groove segments or features formed during the first revolution in known positions. Groove segments or features are typically very small, so the effect has been exaggerated in FIG. 6 for clarity. In an actual cylindrical workpiece, there may be 25,000 to 100,000 groove segments formed during a single revolution, for example, so the effect of the helix angle offset between any two adjacent groove segments would be difficult to observe As a result, feature overlap lines such as 331 and 332, or 431 and 432, may still be noticeable. Another aspect of the present invention relates to the minimization or prevention of the visual significance of these feature overlaps, as described below.

Figure 7A:
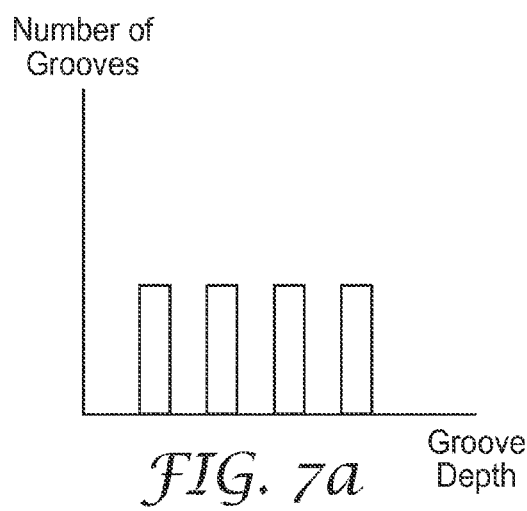
Figure 7:
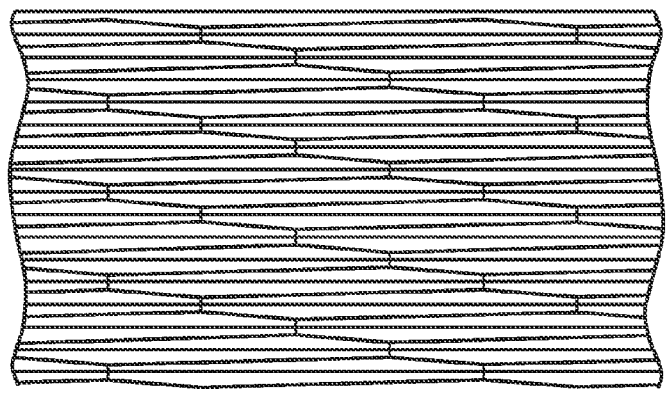

The present invention may advantageously be used to stagger grooves segments or features along a workpiece, or otherwise make the grooves or features appear less repetitive or periodic than those shown in FIGS. 5 and 6. For example, grooves may be formed in what may be termed a "four-brick" pattern, as shown in FIG. 7. In this arrangement, grooves segments or features formed during a second revolution of the roll are offset by ¼ of the length of a single groove segment relative to the first revolution, and the groove segments or features formed during a third revolution of the roll are offset by ¼ of the length of a single groove segment relative to the second revolution, and so on. In other words, the advance per revolution in the Z direction is approximately (and preferably exactly) one-fourth the length of one groove segment. Because FIG. 7 represents very small groove segments formed in a large diameter roll, the helix angle is barely perceptible. A result of this four-brick pattern is to make the pattern of the grooves segments or features less visually apparent.

Although "two-brick" and "four-brick" patterns have been described and illustrated specifically, other patterns can be used based on the same teachings, including odd-numbered brick patterns such as "three-brick," "five-brick," and "seven-brick" patterns, for example. These may all be characterized as "integer" brick patterns, in which the integer is greater than one, but non-integer brick patterns are also possible (e.g. 2.25 brick, 4.5 brick). Different brick patterns may be desirable for various end uses, depending on the importance of optical effects.

Figure 8:
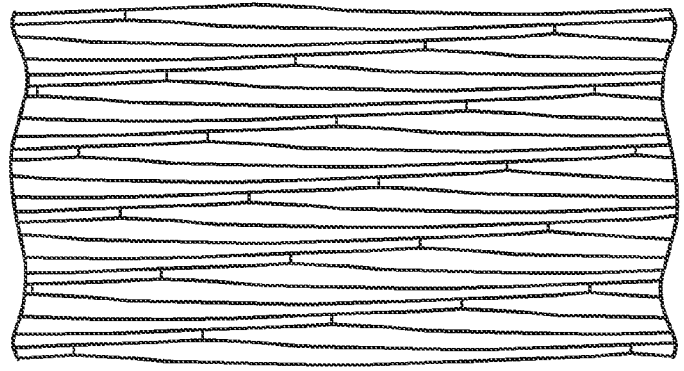

In the Figures described above, groove segments may be shown as discrete or independent of other grooves, except where at their respective ends they may overlap with a previous or subsequent groove as in FIG. 5. An additional aspect of the present invention is the ability to space apart, or abut, or overlap groove segments or other features according to a predetermined pattern. If grooves segments on a workpiece are spaced apart from each other, land areas provided between the grooves may provide certain optical or other advantages in a resulting film, sheeting, or other article made on that workpiece. Groove segments may abut other groove segments, in the sense that there is essentially no land area between adjacent groove segments, but the groove segments do not interrupt or interfere with the shape or symmetry of adjacent groove segments. Groove segments may also overlap successive features or groove segments, so that instead of a regular arrangement of features such as those shown in FIGS. 5 through 7, an arrangement of features with fewer optically perceptible patterns is provided, as shown in FIG. 8. In that Figure, successive groove segments are still formed around the perimeter of the roll, for example, but later groove segments overlap earlier groove segments so that the latter no longer appears to be a perfect, whole groove segment of the type shown in FIGS. 5 through 7. Depending on the location and extent of the overlap, the features cut into the workpiece can appear to be almost random to an observer, and yet can actually be part of a predetermined pattern. This groove segment-overlap feature can be used in conjunction with the various "brick" patterns described above.

Figure 3A:
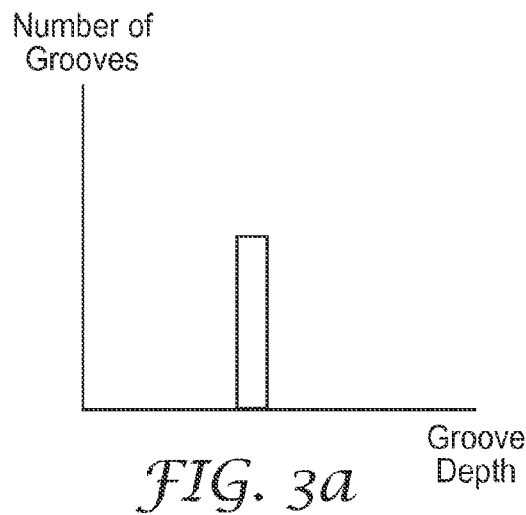
FIGS. 3a, 5a, 5b and 7a are graphical representations of groove-depth distributions determined in accordance with the present invention.
Figure 5A:
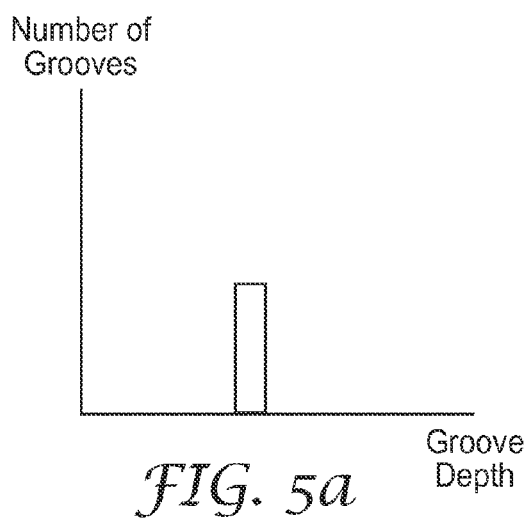
Figure 5B:
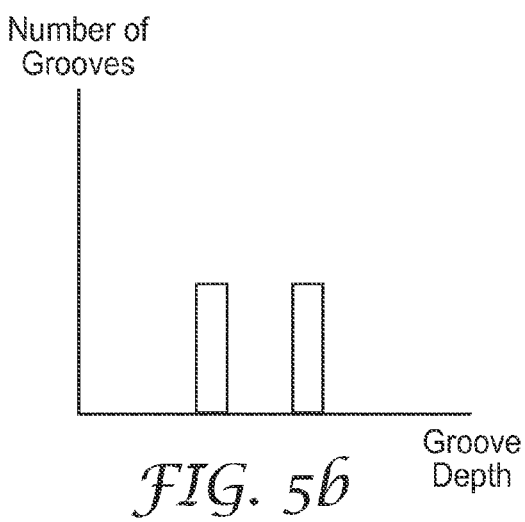

In another aspect of the present invention, uniform patterns of groove segments or features formed in a workpiece, whether offset by a helix angle or not, can be measured to determine their regularity or periodicity. This aspect of the invention involves measuring the groove or feature depth of successive groove segments along an imaginary line parallel to the helix angle (or perpendicular to the longitudinal axis of the groove segments if there is no helix angle). For example, the tool in FIG. 3 includes groove segments without a helix angle, and if the depth of those grooves were plotted on a bar chart, it would appear as the mono-modal groove depth distribution shown in FIG. 3a. The groove depth of the segment of the tool surface shown in FIG. 5, which also has no helix angle, would either be mono-modal (if the imaginary line bisected the groove segments ¼ of the distance in from the end of each segment) or bi-modal (if the imaginary line bisected one groove segment where it is wider and an adjacent groove segment where it is narrower. This is shown in FIGS. 5a and 5b. A groove depth distribution for the pattern shown in FIG. 6, measured along a line parallel to the helix angle, would show the same results as for the pattern shown in FIG. 5, because each is a "two-brick" pattern.

In contrast to the mono-modal or bi-modal groove depth distributions described with respect to FIGS. 5 and 6, the groove depth distributions for the patterns shown in FIGS. 7 and 8 would each be multi-modal, meaning that more than two groove depths would be represented when measured according to the method set forth above. A theoretical multi-modal groove depth distribution is illustrated in FIG. 7a. The number of modes would depend on factors including the degree of overlap between adjacent groove segments or features, and where the line along which the groove depths are measured is positioned, among other factors. It is believed that tools displaying multi-modal groove-depth distribution patterns appear less regular, or more random, to an observer than do tools displaying mono- or bi-modal groove-depth distribution patterns, which is another aspect of the present invention. This is believed to be because the areas where groove segments intersect are not all regularly aligned. Similarly, films, sheeting, or other articles produced using tools having multi-modal groove-depth distributions are also believed to appear less regular, or more random, to an observer or user of those articles. Finally, multi-modal groove-depth distributions may be regular (resulting from an ordered pattern of grooves, as shown in FIGS. 7 and 8, or random (irregular). Tools and articles made using tools having regular multi-modal groove-depth distributions are an additional aspect of the present invention.

In a preferred embodiment of the present invention, the rotation of the workpiece, the rotation of the fly-cutting head, and the z-axis movement of the fly-cutting head operate in a relatively steady state during the entire process of cutting features into a workpiece. This is preferred because it minimizes the time spent stopping, starting, or repositioning the fly-cutting head or the workpiece, or awaiting the return of one or both to a steady operating state after a change. It may also help to minimize errors that may occur due to an interruption in the fly-cutting operation. One way to achieve this steady-state operating mode is to program the controller to run the fly-cutting head and the workpiece at relatively constant velocities, and to provide for a predetermined Z-axis advance for each revolution of the roll, so that successive groove segments (for example) may be formed around the roll on a continuous and predetermined basis from one end of the roll to the other end of the roll.

Although the preceding discussion has typically mentioned movement in a single direction along the Z axis, from an end of a workpiece at which cutting begins toward the opposite end of a workpiece, the fly-cutting head could be programmed to move forward and backward along the Z axis to cut grooves into a workpiece at different successive Z-axis positions, if desired. Also, if a less regular groove pattern were desired, random differences in the groove positions along the Z axis could be introduced (referred to as Z-axis noise), as could random differences in the angular position of the workpiece.

Figure 9:
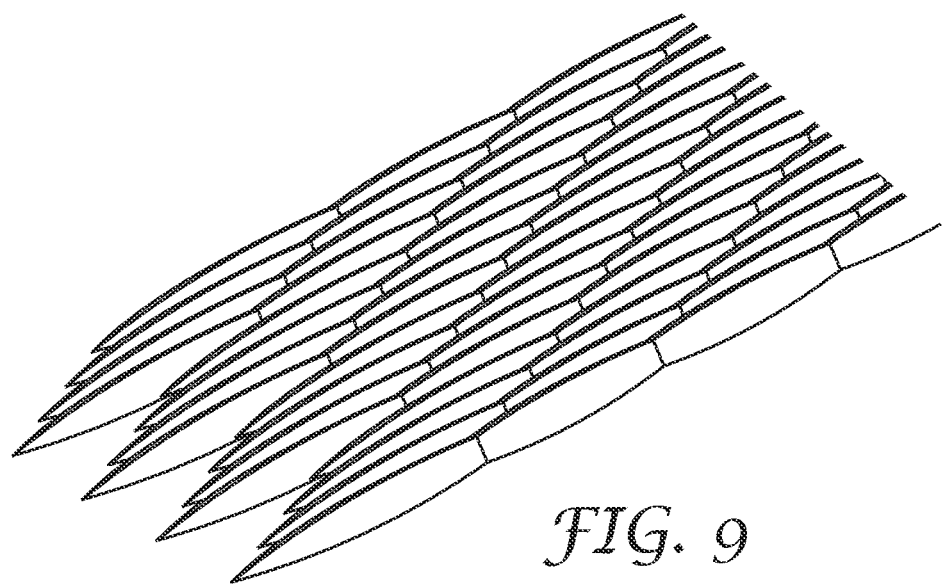
FIGS. 9 and 10 are elevational perspective views of articles made on workpieces made according to the present invention.
Figure 10:
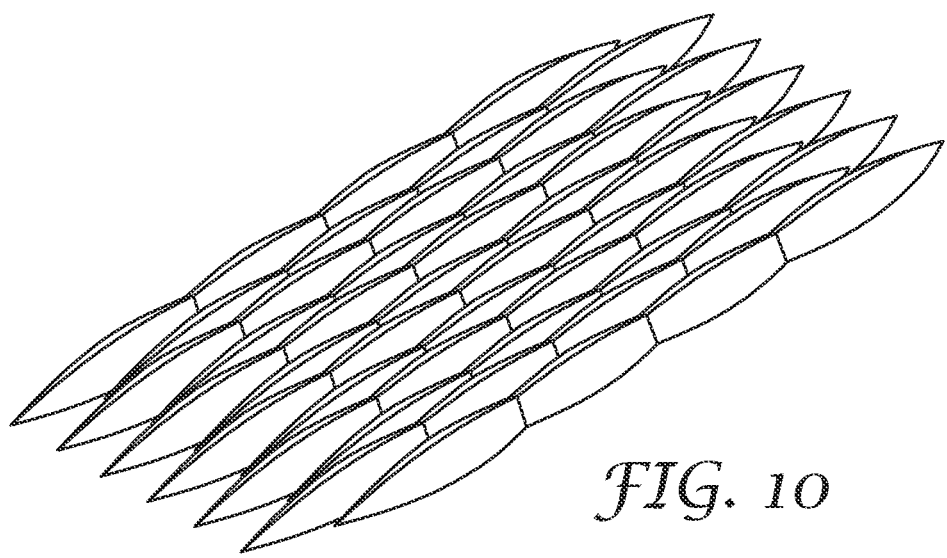

FIGS. 9 and 10 illustrate articles made using tools of the type described above. In particular, the articles of FIGS. 9 and 10 may be microstructured polymeric films, or film surfaces, that have certain optically useful properties. The article shown in FIG. 9 exhibits a four-brick pattern, and a multi-modal groove depth distribution, and the article shown in FIG. 10 exhibits a two-brick pattern of the type described previously. The structures themselves result from adjacent groove segments cut into a workpiece, in which the segments overlap at least at their ends.

Various aspects of the present invention are described as though no features had previously been formed in a workpiece, but the present invention may be used to modify, supplement, or complement features that have been previously been formed in a workpiece. The features may have been formed by other milling, turning, or fly-cutting operations, or any other surface formation or deformation methods now known or later developed. For example, workpieces are sometimes formed with very small pyramids on their surfaces, which can facilitate the formation of polymeric sheeting with the inverse of those pyramids—cube corners—that can reflect incident light. Those pyramids may be formed by three successive passes of a fly-cutting device, any one or more of which may include aspects of the present invention. It may also be useful to perform additional cutting, milling, or other processes to remove or deform material, or refine surface features, following the fly-cutting operations described herein.

Figure 11:
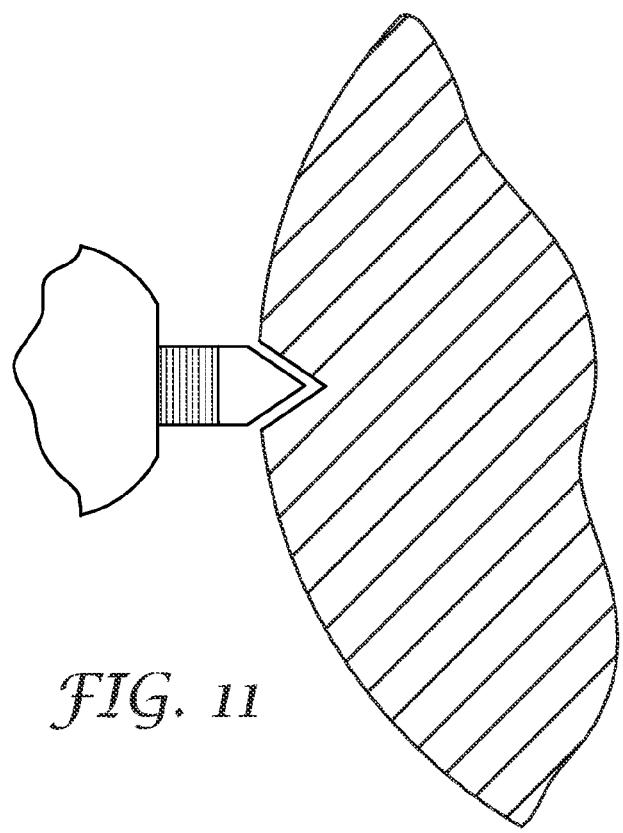
FIG. 11 is a cross-sectional view of a portion of an idealized fly-cutting head with a sharp cutting element cutting a groove or groove segment into a workpiece.
Figure 12:
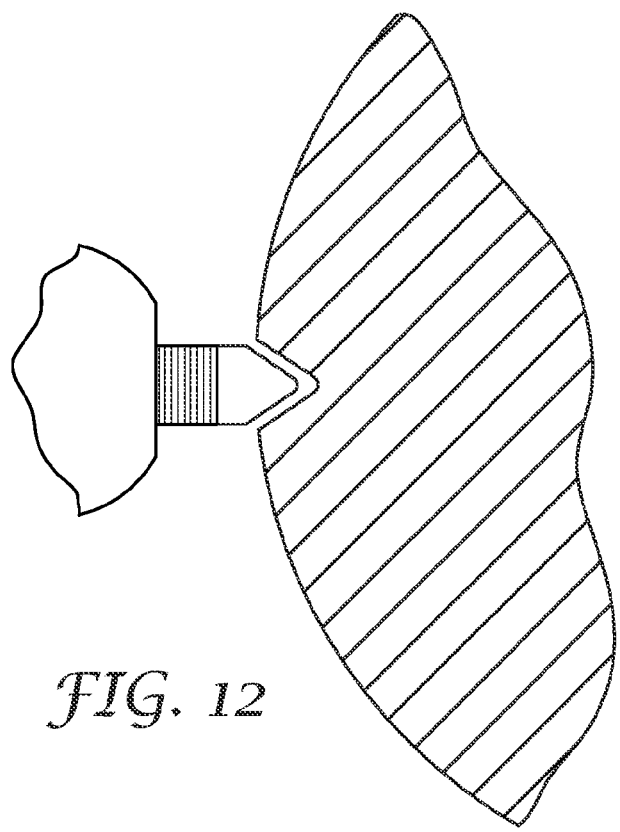
FIG. 12 is a cross-sectional view of a portion of an idealized fly-cutting head with a less sharp or dull cutting element cutting a groove or groove segment into a workpiece.
Figure 13:
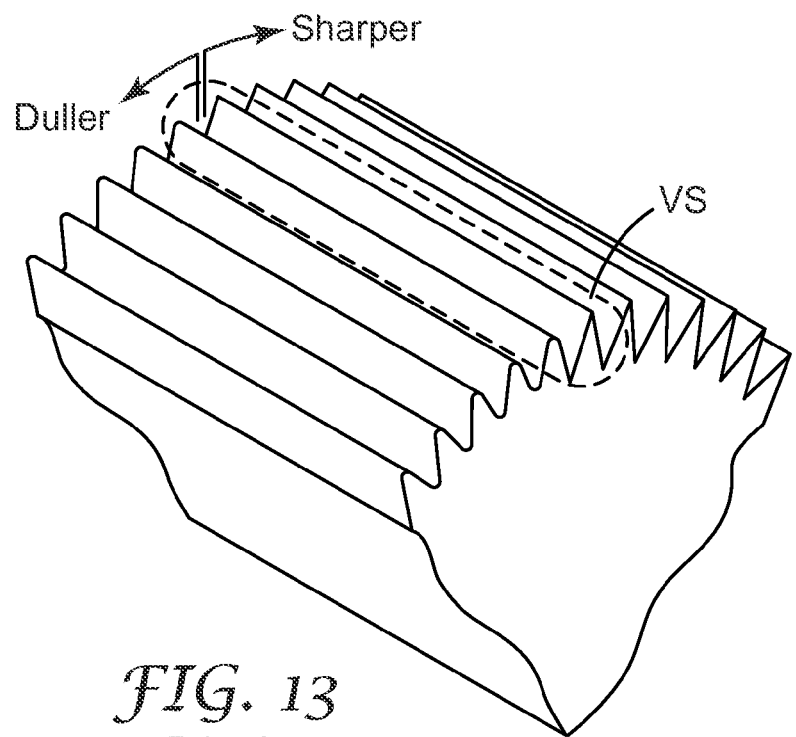
FIG. 13 is a sectional cut-away view of a portion of a tool cut in accordance with the prior art, exhibiting a virtual seam.

The present invention provides a potential solution to an additional problem that is frequently encountered in cutting cylindrical tools. In conventional tool-cutting operations, a cutting element cuts a long groove into a cylindrical workpiece parallel to the Z axis, the workpiece or the tool is indexed, and the cutting element cuts a second long groove parallel to the first, and so on. In a single revolution of the workpiece, the entire surface can be provided with grooves, with the final groove being adjacent to the first groove. However, when the cutting element formed the first groove, the cutting element was relatively sharp, as shown in FIG. 11, but when the cutting element formed the final groove, the cutting element was dull, or at least less sharp, as shown in FIG. 12. FIGS. 11 and 12 are illustrations of a cutting element cutting a workpiece as shown in FIG. 2. The contrast between the first, sharp groove or other feature and the last, dull groove or other feature, may create a virtual seam on the workpiece. This effect is shown in FIG. 13, which is a partial or sectional cut-away view of a portion of a tool cut in accordance with the prior art. At the point where the "sharp" groove cut by a sharp tool is adjacent a final, "dull" groove, a virtual seam results (shown at "VS" in FIG. 13), which will produce a corresponding virtual seam on or in a film, sheeting, or other article made on that workpiece. The interface between a sharp groove and a less sharp or dull groove is referred to as a "virtual seam" because the seam is an optical one caused by the presence of different features on each side of a line, not a physical splicing of two pieces of material (such as metal tooling or polymeric sheeting) together. If the desired final size of the piece of sheeting made on the tool is less than the circumference of the cylindrical tool, it is possible to trim off the virtual seam, but this produces scrap sheeting, perhaps in considerable quantities. If the size of the final piece of sheeting required is greater than the circumference of the tool, then there may be no effective way to avoid using sheeting with a virtual seam.

Figure 14:
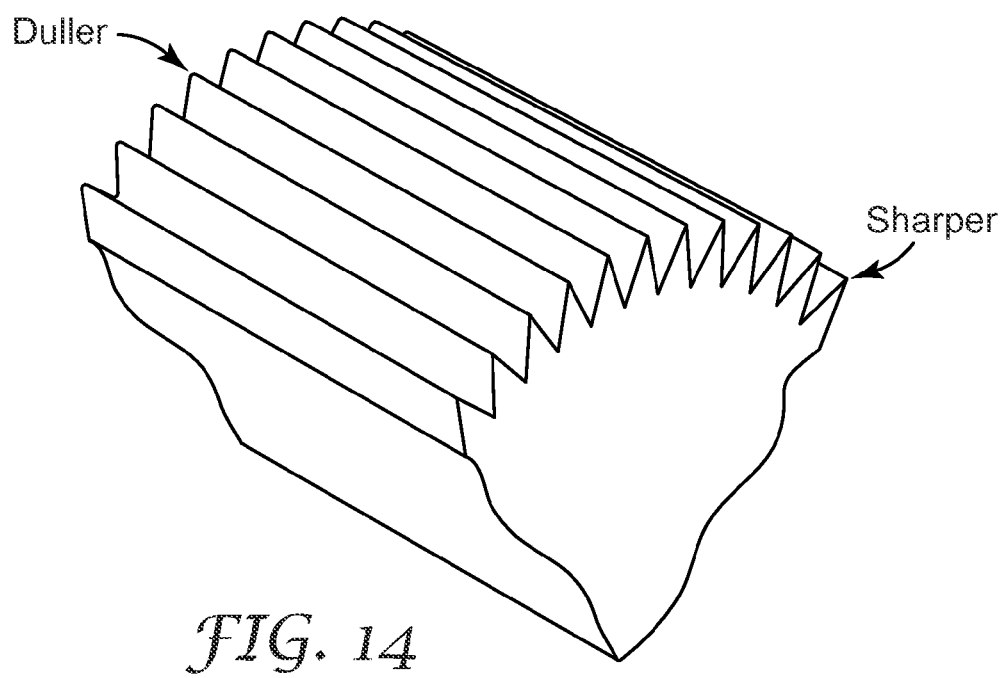
FIG. 14 is a sectional cut-away view of a portion of a tool cut in accordance with the present invention.

This problem can be addressed using certain aspects of the present invention. If groove segments are formed around the perimeter of the roll, and if successive groove segments formed during second and subsequent passes of the fly-cutting head are aligned with previous groove segments, a roll having the equivalent of longitudinally-extending continuous grooves can be produced. This method, however, creates a tool in which the portions of the grooves at one end of a roll are sharp, and the portions of the grooves at the other end of that roll are less sharp, or dull. More importantly, there is no point on such a tooling where a sharp groove and a dull groove are next to each other, and as shown in FIG. 14, no virtual seam is present on the tool. Also, any resulting sheeting, film, or article produced using the tool will not include a virtual seam, which is an advantage of the present invention. The extent to which a cutting element exhibits wear during use may be characterized by progressively increasing radiuses of curvature in regard to pointed tools, because the points become rounded, as shown when comparing FIG. 12 to FIG. 11. Although only rounded exterior cutting element ridges or edges are shown in those Figures, rounded interior cutting element valleys can also wear and exhibit increasing radiuses of curvature. Wear may also be characterized by scratches on flat portions, or facets, of a cutting element, or the departure from flatness of facets. However, the precise extent of the difference between a "sharp" tool and a "dull" tool, or between a "sharp" feature or groove and a "dull" feature or groove is unimportant to the present invention, because it is the avoidance of the virtual seam between a relatively sharper groove produced by a relatively sharper tool and a relatively duller groove produced by a relatively duller tool that is a useful feature of the present invention. Conventional tool-cutting systems are believed to be unable to produce this advantage efficiently.

An additional benefit of the present invention, and specifically of being able to determine the position of a fly-cutting head (and thus its associated cutting elements) is that the position or orientation of the cutting element(s) can be changed in a random or predetermined manner to produce certain desirable effects. For example, the position of a cutting element may be controlled by a controller so that it changes during the time that the cutting element is forming a feature in a workpiece, resulting in a feature having a predetermined shape, position, or both. This is achieved, in one embodiment of the invention, but changing the position or orientation or both of a cutting element (either alone or together with a cartridge or carrier) using an actuator.

The actuator may be any device that effectuates a change in position or orientation of a cutting element, and may be a component of a fast tool servo (FTS). A fast tool servo typically includes a solid state piezoelectric ("PZT") device, referred to as a PZT stack, which can rapidly adjust the position of a cutting tool attached to the PZT stack. PZT stacks are available that have sub-nanometer positioning resolution, and they react very quickly and exhibit essentially no wear after millions or even billions of cycles. Actuators, such as those included in fast tool servos, may be used in closed loop operations, together with a position sensor that enables the actuator to adjust for positioning discrepancies, or in open loop operations with no position sensor. An actuator receives signals from the controller, and thereby controls the manner in which cutting element creates features such as groove segments or grooves in the workpiece. The actuator is preferably removably connected to the fly-cutting head either directly, or indirectly via a cartridge or carrier. Although the actuator may extend the cutting element along the X axis only, actuators may be provided that would move a cutting element along any axis, or (rotationally) around any axis.

The actuator may receive more than one signal or type of signal, through one or more wires, optical fibers, or other signal transmission devices. For example, the actuator may receive AC or DC power, to create the motive force necessary to change the position or orientation of the tool holder. The actuator may also receive a drive signal, which may be proportional to the change in position or orientation to be effectuated by the actuator. The actuator may receive a reference signal, such as a zero-voltage signal, that permits or causes it to return to its initial state, position, or orientation. Finally, the actuator or associated hardware may transmit feedback signals that provide information about the position or relative position of a tool holder or cutting element, for example, so that subsequent changes in the position or orientation of the tool holder or cutting element can be adapted appropriately. Signals of the type described, or other signals, can be transmitted through dedicated wires or optical fibers, or where appropriate they may be multiplexed along a single wire or optical fiber. The transmission of power and of the signals described herein, or any other necessary or useful signals, may also require the use of a slip ring or other mechanism for transferring signals from a stationary component to a rotating component, as is known in the art. One slip ring that may useful is available from Fabricast, Inc. of South El Monte, Calif., under the product number designation 09014. Other components for transferring power or signals, or both, include mercury wetted slip rings, fiber-optic rotary joints (FORJs), and contactless magnetic slip rings.

Although a cutting element cartridge or carrier may be useful in certain embodiments of the invention to facilitate the replacement and accurate positioning of the cutting element, it may be possible to mount a cutting element directly on an actuator without such a carrier. The cutting element may be secured to the cutting element carrier by an adhesive, brazing, soldering, or in other ways, or directly to an actuator.

Articles, such as polymeric films and sheeting, made on tools according to the present invention, or made according to the present invention, may be useful in displays, such as monitors or televisions, or as reflective or retroreflective sheeting of the type used on road signs, or for other purposes. In another embodiment of the present invention, the structure of the tool (a master tool) can be transferred on other media, such as to a belt or web of polymeric material, by a cast and cure process to form a production tool. This production tool is then used to make a microreplicated article of the type described herein. This results in an article having a surface that corresponds to the surface of the master tool. Other methods, such as electroforming, can also be used to copy the master tool. That copy, which may be referred to as an intermediate tool, can then be used to produce the microreplicated article.

In other embodiments of the invention, the cutting elements need not project radially from the fly-cutting head as with conventional fly-cutting heads. Instead or in addition, the cutting elements could extend parallel or generally parallel to the axis of rotation of the fly-cutting head. The cutting elements can be controlled by actuators in the manner described above, and used in an operation referred to as "face-cutting" or "face fly-cutting" to cut certain patterns or features into the surface of a workpiece. In this embodiment, the cutting elements are essentially in continuous contact with the workpiece, not intermittent contact as is normally the case with conventional fly-cutting.

Microreplicated structures such as sheeting of the type described above have been used for retroreflective road signs and license plates for vehicles, for displays such as the displays in portable computers to control the emission of light toward the viewer, other optical films, abrasive or friction-control films, adhesive films, mechanical fasteners having self-mating profiles (as disclosed in U.S. Pat. No. 5,360,270, for example), or any molded or extruded parts having microreplicated features of relatively small dimensions, such as dimensions less than approximately 1000 microns.

The present invention has now been described with respect to several embodiments thereof, but persons of skill in the field will understand that modifications of the invention may be made without departing from the spirit and scope of the invention. For example, structures described as grooves may be features with other characteristics, workpieces described as cylindrical may have other shapes instead, and various components of the system may be assembled in a different manner to achieve the same results. Accordingly, the invention shall be limited not by the foregoing disclosure, but by the following claims, and their equivalents.

We claim:

1. A method of forming adjacent longitudinally-extending features or grooves in a cylindrical workpiece, comprising the steps of:
   (a) forming, beginning near a first end of the workpiece, an initial portion of each feature or groove with a fly-cutting head having one or more continuously rotating cutting elements; and
   (b) forming subsequent portions of each feature or groove with the fly-cutting head during successive revolutions of the workpiece while the workpiece is rotating, the subsequent portions being substantially aligned with the initial portion of each feature or groove, the subsequent portions being formed progressively closer to a second end of the workpiece,
   wherein the initial portion is formed by one pass of a first one of the continuously rotating cutting elements of the fly-cutting head,
   wherein the subsequent portion is formed by one pass of the first one of the continuously rotating cutting elements or another one of the continuously rotating cutting elements of the fly-cutting head,
   wherein the initial portion and the subsequent portion each has a beginning and an end,
   wherein the initial portion and the subsequent portion each has a radius of curvature between the beginning and the end corresponding to a cutting radius of the fly-cutting head used to form the initial portion and the subsequent portion,
   wherein the initial portions of the features or grooves formed near the first end of the workpiece are all relatively sharper than all the subsequent portions of the features or grooves formed closer to the second end of the workpiece.

2. The method of claim 1, further comprising the steps of:
   rotating the workpiece around a first axis of rotation;
   operating the fly-cutting head by rotating the one or more cutting elements around a second axis of rotation;
   positioning the fly-cutting head such that the second axis of rotation is non-parallel to the first axis of rotation of the workpiece;
   determining a rotational position of the one or more cutting elements as a function of time;
   determining a rotational position of the workpiece as a function of time; and
   using the fly-cutting head to cut a series of groove segments in the cylindrical workpiece, the series of groove segments including the initial portion and the subsequent portion, wherein for each of the groove segments in the series, the groove segment is cut with a single pass of one of the cutting elements as the fly-cutting head rotates,
   wherein using the fly-cutting head to cut a series of groove segments in the cylindrical workpiece comprises locating each groove segment cut in the cylindrical workpiece in a predetermined location relative to the other groove segments on the workpiece using the determined rotational position of the one or more cutting elements and the determined rotational position of the workpiece.

3. The method of claim 2, wherein each of the groove segments has a major axis extending at least approximately parallel to the first axis of rotation.

4. The method of claim 3, wherein the fly-cutting head is angled so that the one or more cutting elements at the end of a cut are farther in a direction of rotation of the workpiece than at the beginning of the cut to offset the rotation of the workpiece.

5. The method of claim 3, wherein each of the series of groove segments has a length parallel to its major axis that extends for less than a length of the workpiece along the first axis of rotation.

6. The method of claim 2, wherein the series of groove segments form a brick pattern in the workpiece.

7. The method of claim 2, wherein the series of groove segments combine to form a succession of grooves approximating longitudinal grooves that extend between a first end and a second end on the workpiece.

8. The method of claim 7, wherein cutting the series of groove segments comprises:
   first, cutting each of the groove segments that are adjacent the first end; and
   second, cutting progressively closer to the second end to form the remaining groove segments in the series of groove segments.

9. The method of claim 2,
   wherein rotating the workpiece around the first axis of rotation consists of rotating the workpiece at a first relatively constant velocity, and
   wherein operating the fly-cutting head by rotating the at one or more cutting elements around the second axis of rotation consists of rotating the one or more cutting elements at a second relatively constant velocity.

10. A method of forming features or grooves in a cylindrical workpiece, comprising the steps of:
    forming, beginning near a first end of the workpiece, an initial portion of each feature or groove with a fly-cutting head having one or more continuously rotating cutting elements; and
    forming subsequent portions of each feature or groove with the fly-cutting head during successive revolutions of the workpiece while the workpiece is rotating, the subsequent portions being formed progressively closer to a second end of the workpiece,
    wherein the initial portion is formed by one pass of a first one of the continuously rotating cutting elements of the fly-cutting head,
    wherein the subsequent portion is formed by one pass of the first one of the continuously rotating cutting elements or another one of the continuously rotating cutting elements of the fly-cutting head,
    wherein the initial portion and the subsequent portion each has a beginning and an end,
    wherein the initial portion and the subsequent portion each has a radius of curvature between the beginning and the end corresponding to a cutting radius of the fly-cutting head used to form the initial portion and the subsequent portion,
    wherein the initial portions of the features or grooves formed near the first end of the workpiece are all relatively sharper than all the subsequent portions of the features or grooves formed closer to the second end of the workpiece.

11. The method of claim 10, wherein each feature or groove has a major axis extending at a non-zero angle with respect to a central axis of the cylindrical workpiece.

12. The method of claim 10, further comprising the steps of:
    rotating the workpiece around a first axis of rotation;
    operating the fly-cutting head by rotating the one or more cutting elements around a second axis of rotation;
    positioning the fly-cutting head such that the second axis of rotation is non-parallel to the first axis of rotation of the workpiece;
    determining a rotational position of the one or more cutting elements as a function of time;
    determining a rotational position of the workpiece as a function of time; and
    using the fly-cutting head to cut a series of groove segments in the cylindrical workpiece, the series of groove segments including the initial portion and the subsequent portion, wherein for each of the groove segments in the series, the groove segment is cut with a single pass of one of the cutting elements as the fly-cutting head rotates,
    wherein using the fly-cutting head to cut a series of groove segments in the cylindrical workpiece comprises locating each groove segment cut in the cylindrical workpiece in a predetermined location relative to the other groove segments on the workpiece using the determined rotational position of the one or more cutting elements and the determined rotational position of the workpiece.

13. The method of claim 12, wherein each of the groove segments has a major axis extending approximately parallel to the first axis of rotation.

14. The method of claim 13, wherein the fly-cutting head is angled so that the one or more cutting elements at the end of a cut are farther in a direction of rotation of the workpiece than at the beginning of the cut to offset the rotation of the workpiece.

15. The method of claim 13, wherein each of the series of groove segments has a length parallel to its major axis that extends for less than a length of the workpiece along the first axis of rotation.

16. The method of claim 12, wherein the series of groove segments combine to form a succession of grooves approximating longitudinal grooves that extend between a first end and a second end on the workpiece.

17. The method of claim 12, wherein cutting the series of groove segments comprises:
    first, cutting each of the groove segments that are adjacent the first end; and
    second, cutting progressively closer to the second end to form the remaining groove segments in the series of groove segments.

18. The method of claim 12,
    wherein rotating the workpiece around the first axis of rotation consists of rotating the workpiece at a first relatively constant velocity, and
    wherein operating the fly-cutting head by rotating the at one or more cutting elements around the second axis of rotation consists of rotating the one or more cutting elements at a second relatively constant velocity.

19. The method of claim 10, wherein the features or grooves form a brick pattern in the workpiece.

20. The method of claim 10, further comprising the steps of:
    applying a viscous polymeric material to the workpiece such that the material substantially conforms to the surface of the workpiece; and
    removing the material from the workpiece.

* * * * *